May 24, 1966  G. B. MILLER  3,252,325
FLUID PRESSURE GAUGE
Filed May 24, 1963  2 Sheets-Sheet 1

INVENTOR.
GEORGE B. MILLER

ATTORNEYS

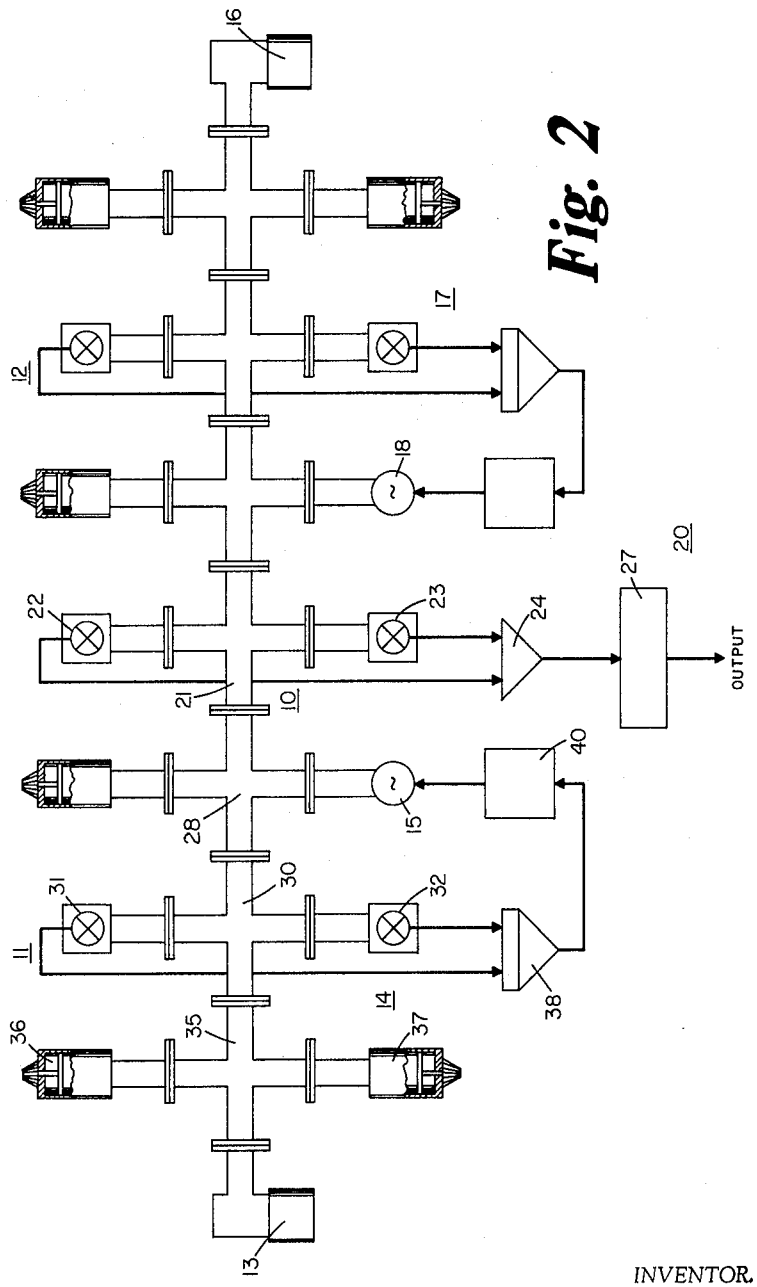

United States Patent Office 3,252,325
Patented May 24, 1966

3,252,325
FLUID PRESSURE GAUGE
George B. Miller, Albuquerque, N. Mex., assignor to Marathon Oil Company, Findlay, Ohio, a corporation of Ohio
Filed May 24, 1963, Ser. No. 282,987
6 Claims. (Cl. 73—398)

This invention relates to fluid pressure indicating apparatus and particularly to an improved high precision pressure gauge suitable for operation at remote locations such as in oil wells.

Many difficulties are encountered in the development and use of pressure sensitive instruments such as fluid pressure gauges suitable for use downhole in oil wells. Furthermore, it is desirable that such instruments be highly sensitive to pressure changes and that they operate with high precision. The petroleum engineer requires accurate data both as to static pressure downhole and as to variations in pressure such as the small transients resulting from drawdown due to pumping of other wells. Various pressure sensitive instruments have been proposed heretofore; however, they have not proved entirely satisfactory for all required applications. Accordingly, it is an object of the present invention to provide an improved fluid pressure gauge of high sensitivity and accuracy.

It is another object of this invention to provide an improved high precision pressure gauge suitable for operation at remote locations such as downhole in oil wells.

It is a further object of this invention to provide an improved fluid pressure indicating instrument for use downhole in oil wells and which can readily be operated from the surface to afford remote reading of the pressure data.

Briefly, in carrying out the objects of this invention in one embodiment thereof an electric circuit of the comparison type is provided for determining the differences between two frequencies, both of which are in the microwave range. A pressure sensing device is provided which is a cavity resonator having an adjustable wall portion, the position of which is changed in accordance with changes in fluid pressure exerted on the sensing device. The resonator controls the frequency of an oscillator so that the output frequency of the circuit is directly proportional to the change in dimension of the resonator. The output frequency of the pressure sensitive circuit is then compared with the output of a similar standard frequency circuit if pressure is to be determined, or it is compared with the output of a similar pressure sensitive circuit, in which case the apparatus indicates the difference between the two pressures.

The features of novelty which characterize the invention are pointed out with particularity in the claims annexed to and forming a part of this specification. The invention itself, however, both as to its organization and method of operation, together with further objects and advantages thereof, may be better understood upon reference to the following description taken in connection with the accompanying drawings, in which:

FIG. 2 is a schematic circuit diagram illustrating in greater detail the wave guides and circuit connections of the invention.

Figure 1:
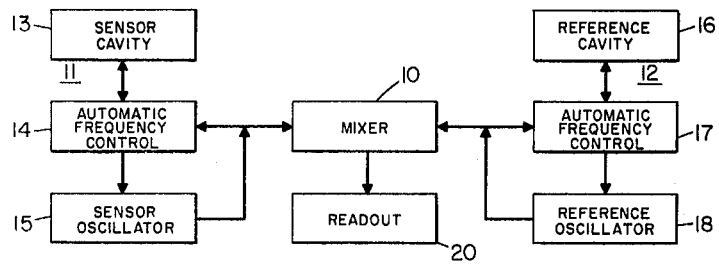
FIG. 1 is a block diagram of a comparison circuit of the invention.

Referring now to the drawings, FIG. 1 illustrates the general arrangement of the circuit of an apparatus embodying the invention. The circuit comprises a mixer 10 which compares the frequency of a pressure sensitive or sensor circuit 11 to the left of the mixer with the frequency of a reference circuit 12 to the right. The sensor circuit 11 consists of the sensor cavity resonator 13, an automatic frequency control circuit (AFC) 14, and a sensor oscillator 15. The AFC circuit 14 controls the sensor oscillator 15 so that the oscillation is at the resonant frequency of the sensor cavity resonator 13. The sensor cavity resonant frequency depends upon ambient pressure. A change in ambient pressure will cause a proportional change of the sensor cavity resonant frequency and therefore a proportional change in the sensor circuit frequency entering the mixer.

The reference circuit 12 comprises a reference cavity resonator 16, an AFC circuit 17, and a reference oscillator 18. The reference circuit operates in the same manner as the sensor circuit with the exception that the reference cavity resonant frequency is not a function of ambient pressure. The reference cavity may either be fixed to provide a constant reference frequency or may be exposed to a reference pressure. In the latter case the output of the apparatus will be differential pressure rather than absolute pressure.

The sensor circuit frequency and the reference circuit frequency are mixed in the mixer 10. The output from the mixer is the difference frequency of the sensor circuit frequency and the reference circuit frequency, and is transmitted to a read-out circuit 20 which converts the difference frequency to provide an indication of pressure units or differential pressure units as the case may be.

Further details of the apparatus are shown in FIG. 2 which illustrates a microwave system utilizing wave guide circuitry for accomplishing the functions just described. The mixer circuit 10 includes an E–H T 21, also known as a magic T, crystal detectors 22 and 23, and a differential amplifier 24. Electromagnetic energy from the sensor circuit 11 to the left enters the T 21 and is divided equally into the branches of the T which contain crystals 22 and 23. Likewise energy from the reference circuit to the right enters the righthand branch of the T 21 and is equally divided between the branches containing crystals 22 and 23.

In the crystals the energy from the sensor and reference circuits is mixed thereby producing an electrical signal at the difference frequency of the sensor and reference frequencies. The electrical signals from crystals 22 and 23 are 180° out of phase so that this mixer circuit operates in a push-pull sense. The signals from crystals are amplified by the differential amplifier 24 and then are converted to pressure units by the read-out circuit 20 including a frequency counter 27.

During the operation of the sensor circuit, energy from the sensor oscillator 15 enters an E–H T 28 and is divided equally between the branches of this T which contain, respectively, the E–H T 21 and a similar T 30. In the T 30 the energy is again divided between crystals 31 and 32 where some energy is absorbed and some is reflected so that it enters an E–H T 35. After entering the wave guide branches of the T 35 which contain tuning stubs 36 and 37, some of the energy thus conducted from the sensor oscillator enters the sensor cavity 13. The cavity resonator impedance is reactive except at resonance so, if the frequency of the energy entering the sensor cavity is not the resonance frequency, the energy leaving the cavity will have been shifted in phase.

The energy leaving the sensor cavity 13 enters E–H T 35 and is reflected from tunable shorts 36 and 37 into E–H T 30 where it is divided equally into crystals 31 and 32. In crystals 31 and 32 the energy reflected from the sensor cavity 13 is mixed with energy arriving directly from the sensor oscillator 15. The circuit around E–H T 30 acts as a phase sensitive detector. If the reflected energy has the same phase as the direct energy, no error voltage will be developed between crystals 31 and 32.

Should there be a phase difference the error signal is generated and is integrated and amplified by an amplifier 38 and then is applied to the sensor oscillator power supply indicated at 40. The result is that the sensor oscillator frequency is corrected back to the sensor cavity resonant frequency. The reference circuit comprises the same arrangement of components and operates in the same manner as the sensor circuit except that the reference cavity resonant frequency is not altered by ambient pressure.

For further information in regard to the nature and operating characteristics of the cavity resonator controlled microwave oscillator, reference may be had to literature, for example, the paper entitled, "Electronic Frequency Stabilization of Microwave Oscillators" by R. V. Pound in the "Review of Scientific Instruments," vol. 17, No. 11, for November 1946, page 490.

Figure 3:
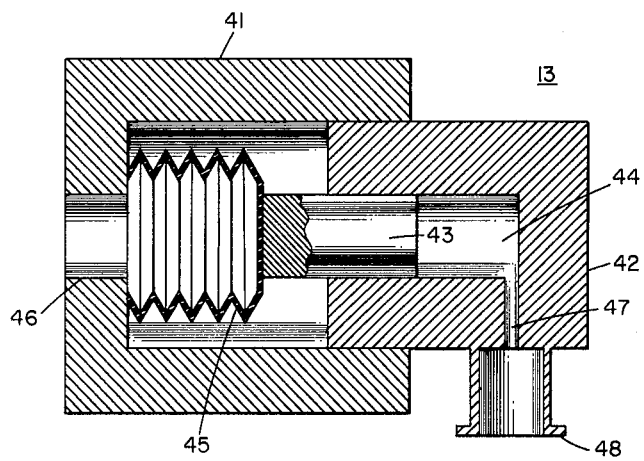
FIG. 3 is an enlarged detail view of the pressure sensing device of the apparatus of FIG. 2.

Both the sensor cavity and the reference cavity are cylindrical microwave cavities operating in a $TE_{011}$ mode. The advantage of the $TE_{011}$ mode of operation is that no currents flow between the end plates and the cylindrical surface of the cavity. Hence, the end plates can be movable without need for good electrical contact with the cylindrical walls. One suitable construction of the pressure sensitive cavity 13 is shown in FIG. 3. This device comprises a cylindrical body 41 having a cavity cylinder 42 rigidly secured thereto. The end plate or wall of the cavity is formed by piston 43 which is free to move in a cylindrical chamber 44 formed in cylinder 42. The position of the piston 43 is controlled by a bellows 45 the interior of which is open to ambient pressure through an orifice 46. The bellows is mounted on the end of the piston 43 and sealed to the wall of the body 41 about the orifice 46. Changes in ambient pressure thus either contract or extend the bellows 45 and position piston 43 in cylinder 44. Thus the length of the cavity is determined by pressure.

Also, since the $TE_{011}$ resonant mode frequency is a function of cavity length, the resonant frequency of the cavity is determined by pressure. For example, if the bellows compliance is 439 Angstroms per pound per square inch and the cavity resonant frequency changes 22.8 cycles per second per Angstrom change in length, then for a $TE_{011}$ cavity with a resonant frequency of $25 \times 10^9$ cycles per second, the cavity resonant frequency will change $10^4$ cycles per second per pound per square inch change in ambient pressure. A change of .01 pound per square inch in the ambient pressure will cause 100 cycles per second change in the frequency difference between the sensor circuit and the reference circuit.

In FIG. 3 the cylinder walls 42 are made quite thick for dimensional stability. Otherwise the usual design criteria for cavity resonators are followed. Microwave energy enters and leaves the cavity by a port 47. A flange 48 is provided for wave guide connection. The body 41 is rigidly secured to the cavity cylinder 42 to provide a fixed position for the outer edge of the bellows which is bonded to the body 41. The body 41 is made heavy or thick for dimensional stability.

The reference cavity 16 may be constructed in essentially the same manner as the sensor cavity 13 shown in FIG. 3, except that in the reference cavity no orifice 46 is provided, the chamber being closed so that ambient pressure cannot act upon the bellows. Using identical cavities, with the exception that the reference cavity is closed to the ambient pressure, in a comparison system provides temperature compensation when the two cavities are in the same temperature environment, as will generally be the case in bore-hole conditions.

The entire microwave system comprising the oscillators, E–H T's, crystals, tuning stubs, and cavity resonators can be included within the dimensions of a standard logging tool. Also the amplifiers and power supplies are easily constructed to fit within logging tool dimensions. It is preferable to have the read-out circuit on the surface to provide a continuous record of variations in fluid pressure in the bore-hole.

The apparatus of this invention as described above has been illustrated in connection with an absolute pressure gauge; it will be apparent, however, that the same system may be employed as a differential gauge, in which case it may be made capable of measuring pressure changes as small as 1 part in $10^8$ at essentially any absolute pressure level. Such extreme differential sensitivity may be employed to effect the measurement of very small effects at great depths and, for example, could be employed to detect the influence of crustal tides. In the oil fields such a differential pressure gauge can be effectively employed to examine the drawdown effects of remote wells. For the differential pressure gauge application, the reference cavity 16 is provided with an opening to the interior of the bellows corresponding to the orifice 46 of the cavity 13, and the interior of the bellows is thereby subjected to a pressure other than the ambient pressure of the cavity 13 and which is to be compared with the ambient pressure.

While the invention has been described in connection with a specific form of pressure detector and wave guide circuitry, various other arrangements and modifications will occur to those skilled in the art. Therefore it is not desired that the invention be limited to the specific details illustrated and described and it is intended by the appended claims to cover all modifications which fall within the spirit and scope of the invention.

I claim:
1. A fluid pressure gauge comprising a fluid pressure sensing means, a cavity type electric wave resonator, means connecting said sensing means and said resonator for varying a dimension of the cavity of said resonator in accordance with changes in fluid pressure, an oscillator, means utilizing said resonator for controlling the frequency of said oscillator, a second oscillator, means dependent upon a reference pressure for controlling the frequency of said second oscillator, means connected with both said oscillators for comparing the frequencies of said oscillators to determine the difference between said frequencies, and indicating means operative in response to the difference between the frequencies of said oscillators.

2. A fluid pressure gauge as set forth in claim 1 wherein said frequencies lie in the microwave region and wherein said cavity resonator is of cylindrical configuration and comprises a block having a movable plunger for varying the length of said cavity, and wherein said sensing means is arranged to move said plunger in proportion to changes in the fluid pressure to which said sensing means is subjected.

3. A fluid pressure gauge comprising a fluid pressure sensing means, a first cavity type electric wave resonator, means connecting said sensing means and said resonator for varying a dimension of the cavity of said resonator in accordance with changes in fluid pressure at said sensing means, a first oscillator, means utilizing said first resonator for controlling the frequency of said first oscillator, a second cavity type electric wave generator, means dependent upon a second fluid pressure for controlling a dimension of said second resonator, a second oscillator, means utilizing said second resonator for controlling the frequency of said second oscillator, means connected with both said oscillators for comparing the frequencies of said oscillators to determine the difference between said frequencies, and means for utilizing the difference between said frequencies for indicating the difference between the fluid pressure at said sensing means and said second fluid pressure.

4. A fluid pressure gauge as set forth in claim 3 wherein said first and second resonant cavities are constructed of the same material and have identical dimensions whereby when said cavities are subjected to the same ambient temperature said gauge is compensated for changes in ambient temperature.

5. A fluid pressure gauge comprising a fluid pressure sensing means, a cavity resonator for microwave frequencies, said resonator having an adjustable wall for changing one dimension thereof to vary the resonant frequency thereof, means connecting said sensing means and said adjustable wall for varying the resonant frequency of said resonator in accordance with changes in fluid pressure, a microwave oscillator, wave guide means connecting said oscillator and said resonant cavity for utilizing said cavity to control the frequency of said oscillator, said wave guide means comprising first and second and third E–H T's connected in series, said cavity being connected to said first T and said oscillator to one branch of said third T, first and second crystal detectors terminating respective opposite branches of said second T, tunable stubs connected at the ends of the opposite branches of said first T and at the end of the branch of said third T opposite said oscillator, a phase sensitive detector connected between said crystals for producing a signal dependent upon the phase difference between said crystals and having an output connected to said oscillator for controlling the frequency of said oscillator in accordance with the phase difference between said crystals, a fourth E–H T connected on one side to said third T and having third and fourth detector crystals in its respective opposite branches, means providing a reference frequency source connected to the other side of said fourth T, a second phase sensitive detector connected between said third and fourth crystals for producing a second signal proportional to the difference between said reference frequency and the frequency of said resonant cavity, and read-out means responsive to said second signal for indicating fluid pressure conditions.

6. A fluid pressure gauge as set forth in claim 5 wherein said reference frequency providing means comprises a second resonant cavity and a second pressure sensing means for determining the resonant frequency of said second cavity, and including a second oscillator and a second wave guide means including components corresponding to and arranged in the same manner as the respective components of said first mentioned wave guide means for connecting said second resonant cavity and said fourth E–H T and for controlling the frequency of said second oscillator.

References Cited by the Examiner

UNITED STATES PATENTS

| | | | |
|---|---|---|---|
| 2,449,166 | 9/1948 | Hershberger | 73—24 |
| 2,666,326 | 1/1954 | Poole et al. | 73—69 X |
| 2,922,924 | 1/1960 | Bundy | 333—83 |
| 3,034,357 | 5/1962 | Brown | 73—419 X |

RICHARD C. QUEISSER, *Primary Examiner.*

DAVID SCHONBERG, L. R. FRANKLIN,
*Examiners.*